United States Patent
James

[15] 3,650,144
[45] Mar. 21, 1972

[54] APPARATUS FOR CLADDING ELONGATED ARTICLES WITH STAINLESS STEEL FOIL

[72] Inventor: David James, Coychurch, near Bridgend, Glamorgan, Wales

[73] Assignee: Drawn & Rolled Sections Limited, Glamorgan, England

[22] Filed: July 2, 1969

[21] Appl. No.: 838,457

[30] Foreign Application Priority Data

July 4, 1968  Great Britain....................31,931/68

[52] U.S. Cl................72/467, 29/243.57, 29/470.5, 29/475, 29/505, 29/521, 76/107, 93/59
[51] Int. Cl........................................B21d 3/00
[58] Field of Search............29/505, 521, 470.5, 475, 514, 29/243.57, 243.58; 76/107; 156/91, 233; 93/59; 72/291, 467

[56] References Cited

UNITED STATES PATENTS

| 43,008 | 6/1864 | Campbell | 29/243.57 |
| 157,867 | 12/1874 | Pollard | 29/243.57 |
| 285,896 | 10/1883 | Holland | 72/467 |
| 466,105 | 12/1891 | Rockhausen | 29/505 |
| 887,995 | 5/1908 | Beyrle | 29/505 |
| 990,470 | 4/1911 | Beyrle | 29/243.57 |
| 1,842,037 | 1/1932 | Mason | 72/467 X |

*Primary Examiner*—Charlie T. Moon
*Attorney*—Nolte and Nolte

[57] ABSTRACT

In the cladding of elongated articles with a stainless steel foil, the article together with the foil is fed to a wrapping die, which is shaped to progressively fold the foil around the elongated article. Hitherto, it has been the practice to form the die entirely from a ferrous material, which because of the relatively hard nature of the stainless steel foil, wears considerably with the result that swarf or contaminants may become embedded in the die surfaces. The surfaces of stainless steel foils subsequently folded by the die become scored and pitted. Particles which become embedded the damaged foil surfaces can initiate the formation of rust, resulting in rapid detioration of the appearance of the cladded article.

The invention provides a method of cladding an elongated article with a stainless steel foil, which includes the step of feeding the article and the foil through a wrapping or binder die which is provided, at least on the inner surface portion of the die which is in contact with the foil, with a replaceable nonferrous liner. Apparatus for cladding an elongated article with stainless steel foil is also disclosed.

4 Claims, 5 Drawing Figures

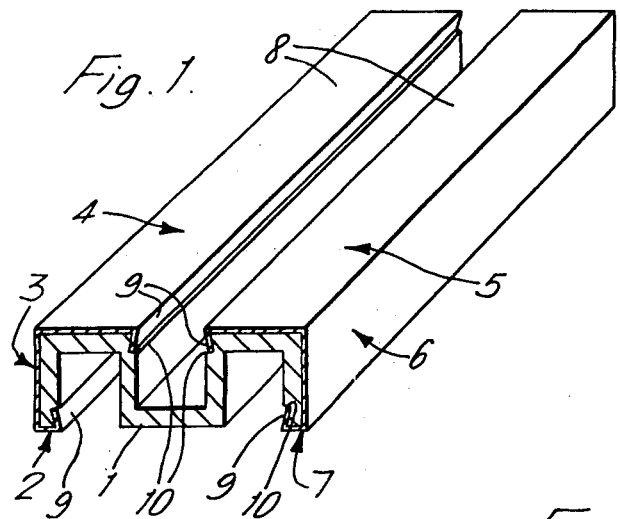
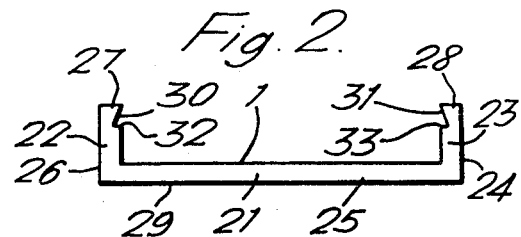
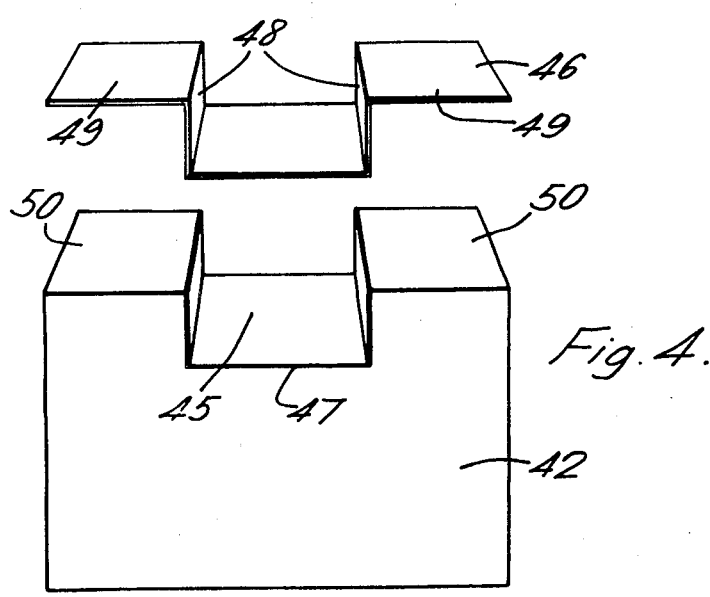
INVENTOR
DAVID JAMES

INVENTOR
DAVID JAMES 3,650,144

APPARATUS FOR CLADDING ELONGATED ARTICLES WITH STAINLESS STEEL FOIL

BACKGROUND TO THE INVENTION

This invention relates to a method and apparatus for cladding elongated articles with stainless steel foil.

In the cladding of elongated articles with a foil, the articles together with the foil are usually fed to a wrapping die, during the course of the cladding operation, the die being so shaped as to cause the foil to be progressively folded around the elongated article. The main body of the die is conventionally of a harder material than the cladding foil. When stainless steel foil is to be progressively folded by a stationary die, the latter will need to be of a harder material than the stainless steel and this requirement will normally be met by the use of ferrous material in the construction of the die.

Passing the stainless steel foil through such a ferrous die, however, suffers from very serious drawbacks. Because of the relatively hard nature of the stainless steel foil, there is a considerable amount of wear on the die, resulting in a formation of a number of small particles which become embedded into the stainless steel foil as a result of the motion of the stainless steel foil together with the elongated body which it is to be clad, and this results in the formation of a scored and pitted surface. The particles embedded in this surface can initiate the formation of rust. In this way, the life of the cladded article may be seriously effected and the surface finish provided on the cladded article is less good than might otherwise be possible.

The present invention seeks to provide a method of and apparatus for the cladding of an elongated article with a stainless steel foil in which the above-mentioned disadvantages are obviated or substantially reduced.

SUMMARY OF THE INVENTION

According to one aspect of the invention, a method of cladding an elongated article with a stainless steel foil includes the step of feeding the article and the foil through a wrapping or binder die which is provided, at least on the inner surface portion of the die which is in contact with the foil, with a replaceable nonferrous liner.

According to a second aspect of the invention an apparatus for cladding an elongated article with stainless steel foil comprises a wrapping die shaped to progressively fold the foil about the elongated article to be cladded, the die being provided with a nonferrous replaceable liner on at least its inner surface where it contacts the stainless steel foil.

If appropriate, the foil is passed through a shaping die prior to being fed together with said article to the wrapping die.

The nonferrous liner may be a copper based alloy, such as brass or bronze, or it may even be made of a paper such as is used in ledgers. Means may be provided for retaining the liner in position such as by extensions clamped between the mating edges of the die sections to prevent the liner being pulled through the die by the article being clad. Alternatively projections or folded over portions engageable with the entry side of the die may be provided, or the die, which has the usual flare therein may retain the liner purely be a wedging action.

Preferably, the stainless steel foil used has a thickness of less than 0.025 inches.

BRIEF DESCRIPTION OF THE DRAWINGS

The invention will now be described in greater detail by way of example and reference to the accompanying drawings in which:

FIG. 1 is a perspective view of a short length of one example of an elongated member which has been cladded with stainless steel foil in accordance with the invention;

FIG. 2 is a sectional view of a simplified elongated member of U-section cladded on the outside thereof in accordance with the invention;

FIG. 4 is a perspective view of the lower half of the binder or wrapping die shown in FIG. 3, showing the detachable liner thereof.

DETAILED DESCRIPTION OF THE INVENTION

Figure 3:
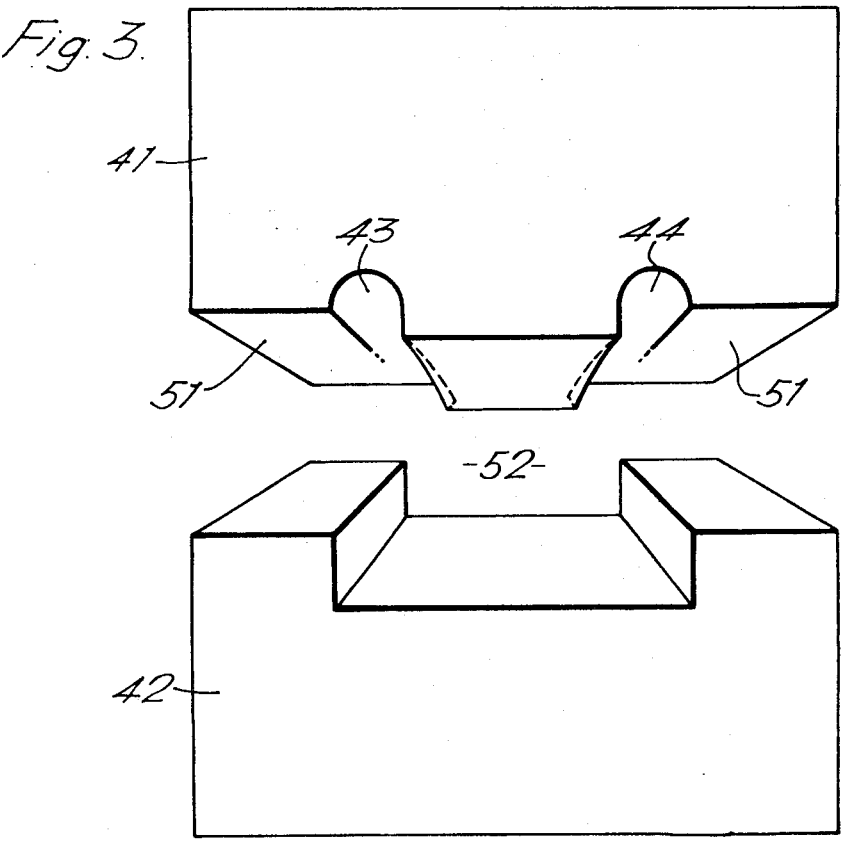
FIG. 3 is a perspective view of a binder or wrapping die which is suitable for use in cladding the U-section of FIG. 2.

Referring firstly to FIG. 1, there is shown one example of an elongated member cladded in accordance with the invention with a stainless steel foil of, for example, 28 gauge stainless steel sheet (0.0140 in thickness). In any event, the thickness of the stainless steel foil should not exceed 0.025 inches. The elongated member to be cladded in this case is an aluminum alloy body 1 of zigzag section, having some of its surfaces, i.e., surfaces 2 to 7, cladded or faced with stainless steel foil 8 which is bonded to the surface adhesively. As can be seen the stainless steel foil facing extends beyond the edges of the surfaces to be faced and is bent inwardly at 9, the bend portions assisting in maintaining the bond, protecting the edges of the surfaces and providing a smooth edge. To facilitate a proper fold back of the edges 9, the body 1 is indented at 10 to receive the edges 9.

FIG. 2 is a sectional view of a simpler cladded member for use in discussion of the dies by which the stainless steel foil is formed to the shape of the elongated article. This elongated article has an aluminum alloy body 1 of U-shaped cross section having a relatively broad base 21 and two upstanding arms 22 and 23. The outer faces of the body member 1, i.e., the faces 24, 25 and 26 together with the end faces 27 and 28 of the arm portions 22 and 23 respectively are cladded with a stainless steel foil 29 adhesively secured thereto. The edges 30 and 31 of the foil are bent downwards along the inside of the arms of the U to assist in retaining the bond between the stainless steel foil and the aluminum alloy body 1. For this purpose the arms 22 and 23 are formed respectively with indentations 32 and 33.

Referring now to FIG. 3 there is shown a binder or wrapping die suitable for shaping the foil 29, in relatively unformed condition, to the aluminum alloy body 1. The die consists of an upper or top half 41 and a lower half 42, the two halves when brought together forming the die itself. It will be seen that the die cavity 52 as well as providing the general shaping action of the stainless steel foil, has special guide channels 43 and 44 for folding over the top edges of the foil 25 so as to tuck them about the arms of the U and into the indentations 32 and 33 provided therein.

FIG. 4 shows the bottom half 42 of the die shown in FIG. 3 and a liner 46 for use therewith. The liner 46 is of substantially the same shape as the bottom half of the die cavity 45 of the bottom of the die, but whereas the die cavity is flared towards the entry side 47 thereof, the liner 46 is constructed with parallel sides 48, which, when in use will be forced to take up the configuration of the die cavity by the metal passing therethrough. The liner is formed with extension pieces 49 which seat on the mating faces 50 of the lower die section and are secured in the die cavity by a combination of the gripping action between the mating faces 50 of the bottom section and the corresponding mating faces 51 (FIG. 3) (or upper liner not shown) of the upper section 41 and by the flared shape of the die. The particular liner shown is constructed as a 0.1 inch brass shim but may be equally well be constructed from a thin sheet of bronze or, where frequency of replacement is no serious objection, from a sheet of ledger paper or other suitable nonferrous material. The main body of the die itself may conveniently be made of steel of a suitable composition.

It will be appreciated that a similar liner (not shown) will be provided for the upper section of the die if this section comes into contact with the stainless steel foil. The liner need only be of approximately the same shape as the cavity since they will adapt to the cavity in use. Where the effect of the die on the elongated article is not significant, for example, on these parts of the article which are not cladded, partial liners may be used. As will be readily appreciated, the liners can easily be replaced simply by opening the die, removing the worn liner and replacing it by a new one.

In carrying out the invention to provide for cladding of a typical elongated body member such as that shown in section in FIG. 2, the basic steps in the operation include applying to the body and/or the stainless steel foil a suitable adhesive substance, after abrading the appropriate surfaces as may be necessary to form a key for the adhesive. The abrading may suitably be carried out by a pad of the material known under the Registered Trade Mark "SCOTCH BRITE." The pad may conveniently be positioned in front of a preshaping die, where one is used, any suitable means being used to apply pressure thereto and means also being provided for lubricating the die as necessary. The stainless steel foil and the aluminum alloy body are then fed through a die such as is shown in FIG. 3 having liners as described in connection with FIG. 4, whereupon the stainless steel foil is progressively folded around the body member during which action it will be adhesively secured to the body member by the pressure exerted by the die. Additional pressure may be applied to any of the cladded surfaces where required before or after the material reaches the die so that any surfaces requiring extra pressure will be appropriately treated. When necessary the foil may be preshaped preceding the wrapping die by one or more preshaping dies to ensure that a correct bond is made in the wrapping die. If necessary the foil may be over shaped to prevent it from pulling away from the body member while in the die thus preventing the formation of a satisfactory bond.

Examples of suitable adhesive substances for use where the stainless steel foil is cladded on to an aluminum alloy body are:

1. Araldite AY 103 with HY 951 Catalyst

This is an adhesive substance of a medium viscosity which can be cured at 68° F. for 24 hours. It may be used on flat surfaces and where the length and size of the member make it difficult to use applied heat for a short cured time.

2. Araldite AV 100 with HV 100 Catalyst

This is a high viscosity adhesive substance curing at 212° F. for 30 minutes. The use of this adhesive substance is mainly on irregular surfaces because it is easier to apply than an adhesive substance of medium viscosity.

3. Epophen EL5 Resin with EHL–4–2 and EHL–7–2 Catalyst

With the EHL–4–2 catalyst, this adhesive substance has a medium viscosity and with the EHL–7–2 catalyst it has a high viscosity. It can be cured at about 140° F. for 4 hours.

4. Neoprese based adhesives substances

These adhesive substances can be used on large areas and since no heat curing is necessary, they can be used where heating is undesirable.

In the case of most of the adhesive substances, it is usual to coat both of the surfaces to be bonded but in certain cases this is not necessary and only one surface needs to be coated. The bonding pressure is applied as previously stated by the wrapping or binder die, additional bonding pressure being applied to the specific parts of the cladding where necessary.

Figure 5:
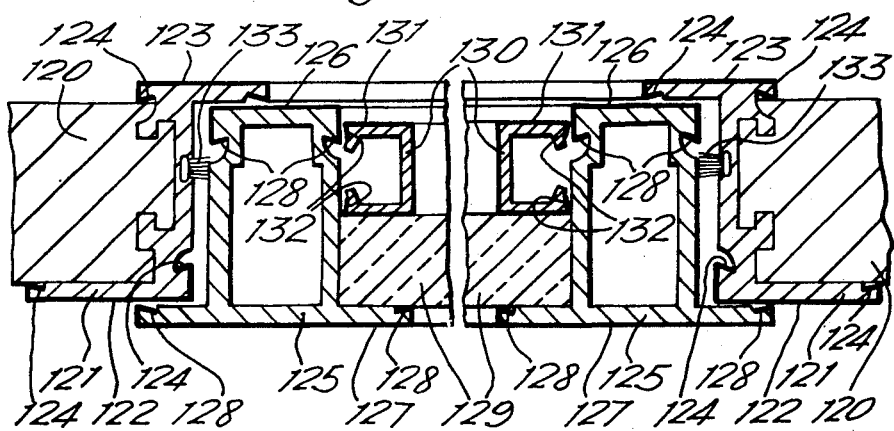
FIG. 5 is a plan sectional view of a window frame made out of a number of elongated cladded members used as constructional members.

In FIG. 5 there is shown one example of the use of cladded elongated members formed in accordance with the invention as constructional members. In this particular instance they are being used in the construction of an opening window. The window is shown in sectional plan view, the window being hinged above the section and having its opening edge below.

In this figure, 120 indicates the wall in which the window is situated. The fixed part of the frame is constructed of four identical constructional members two of which are shown at 121 and have two faced or cladded portions 122 and 123 (shown by the darker lines), each of which provide the facing for the frame on both sides of the wall 120. As can be seen the edges of these facings are bent inwardly at 124.

The hinged portion of the window is also made up of four constructional members two of which are shown at 125 having two oppositely positioned facings or claddings 126 and 127 also bent inwards at their edges at 128.

Glass 129 is held in the window by retaining members 130 which are also faced as at 131. Because of the position of these members and their shape and size, no special indentation is provided for the edges 132. A sealing member is provided between the fixed frame and the opening frame as indicated at 133.

From the above description it will be seen that the present invention provides a method and an apparatus for cladding elongated articles such as aluminum alloy articles with stainless steel foil so as to provide elongated articles in a form which can be of use, for example, in the building construction industry. Thus many different sectional shapes can be constructed with the cladding positioned to cover only the parts thereof required. With the invention a superior finish can be achieved as a result of the use of liners in the wrapping or binder die. The formation of pits or scars in the surface is prevented and particles which could initiate rust or other discoloration from being embedded therein are no longer present. Where the liner concerned is of a nonmetallic material, an additional advantage in certain cases is that it prevents any electrolytic action between the particles of the liner and the stainless steel surface.

It is to be understood that the invention is not limited to cladding aluminum alloy members but may be equally well employed for cladding other suitable material with stainless steel foil.

I claim:

1. A die for cladding an elongated article having a substantially U-shaped cross section with stainless steel foil, comprising:

two separable and cooperable die members each formed from a material harder than stainless steel, a pressure-applying surface portion of one of said two die members defining a substantially U-shaped cavity adapted to receive said elongated article and said foil, and a replaceable liner for said cavity, said liner being conformable to said U-shaped cross section and formed from a stiff sheet of nonferrous material softer than stainless steel.

2. The die as defined in claim 1, wherein said nonferrous material is ledger paper.

3. The die as defined in claim 1, wherein said pressure-applying surface portion of said one of said two die members is provided with a first mating surface portion, the other of said two die members is provided with a second mating surface portion cooperable with said first mating surface portion, and said liner is provided with an extension piece seating on said first mating surface portion.

4. The die as defined in claim 1, wherein a base portion of said U-shaped cavity is flared towards the entry side of the die, and a base portion of said liner is provided with lateral members parallel to one another in a plane parallel to said base portion.

* * * * *